(12) United States Patent
Brofeldt

(10) Patent No.: US 7,124,982 B2
(45) Date of Patent: Oct. 24, 2006

(54) DEVICE FOR BRACING A SHELL IN AN AIRCRAFT FUSELAGE

(75) Inventor: Pär Brofeldt, Linköping (SE)

(73) Assignee: SAAB AB, Linkoping (SE)

( * ) Notice: Subject to any disclaimer, the term of this patent is extended or adjusted under 35 U.S.C. 154(b) by 0 days.

(21) Appl. No.: 10/479,663

(22) PCT Filed: Apr. 23, 2002

(86) PCT No.: PCT/SE02/00787

§ 371 (c)(1),
(2), (4) Date: Dec. 4, 2003

(87) PCT Pub. No.: WO02/098733

PCT Pub. Date: Dec. 12, 2002

(65) Prior Publication Data

US 2004/0195452 A1   Oct. 7, 2004

(30) Foreign Application Priority Data

Jun. 5, 2001   (SE)   .................................... 0102009

(51) Int. Cl.
B64C 1/06   (2006.01)

(52) U.S. Cl. .................................................... 244/119

(58) Field of Classification Search ................ 244/119, 244/123
See application file for complete search history.

(56) References Cited

U.S. PATENT DOCUMENTS

| | | | | |
|---|---|---|---|---|
| 2,233,969 A | * | 3/1941 | Woods | 244/123 |
| 2,389,767 A | * | 11/1945 | Dalton | 52/506.06 |
| 2,427,853 A | * | 9/1947 | Goodlett | 244/123 |
| 4,310,132 A | | 1/1982 | Robinson et al. | |
| 5,242,523 A | * | 9/1993 | Willden et al. | 156/285 |
| 6,114,012 A | * | 9/2000 | Amaoka et al. | 428/182 |
| 6,364,250 B1 | | 4/2002 | Brinck et al. | |
| 6,427,945 B1 | * | 8/2002 | Bansemir | 244/129.1 |

FOREIGN PATENT DOCUMENTS

DE   198 44 035   11/1999

* cited by examiner

*Primary Examiner*—Tien Dinh
(74) *Attorney, Agent, or Firm*—Bingham McCutchen LLP

(57) ABSTRACT

A device for bracing a shell surface in an aircraft fuselage against deformations and consisting of a continuous profile that is arranged so as, after conformation, to be mounted against the shell surface. Notches are spaced at regular distances apart from each other in at least a portion of the profile. The notches extend through a base surface in the profile, and through an intermediate part perpendicular to the base surface. The notches are delimited upwardly by an upper surface that is not encompassed by the notches.

2 Claims, 3 Drawing Sheets

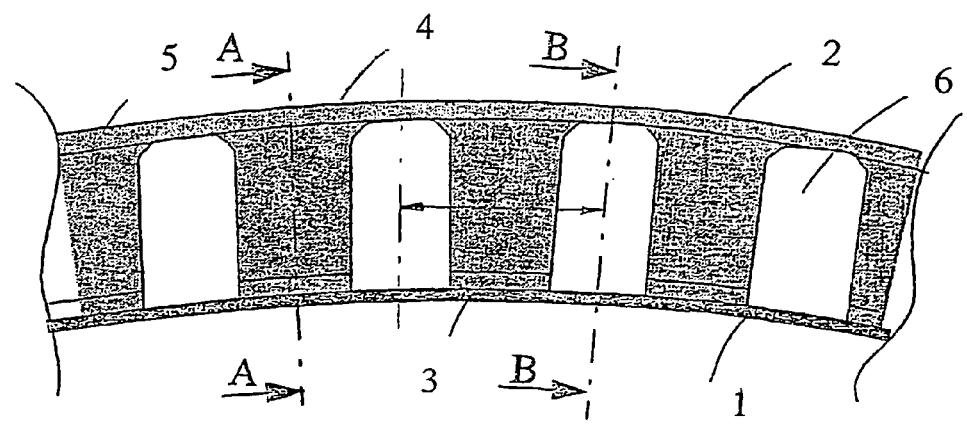
Fig 2
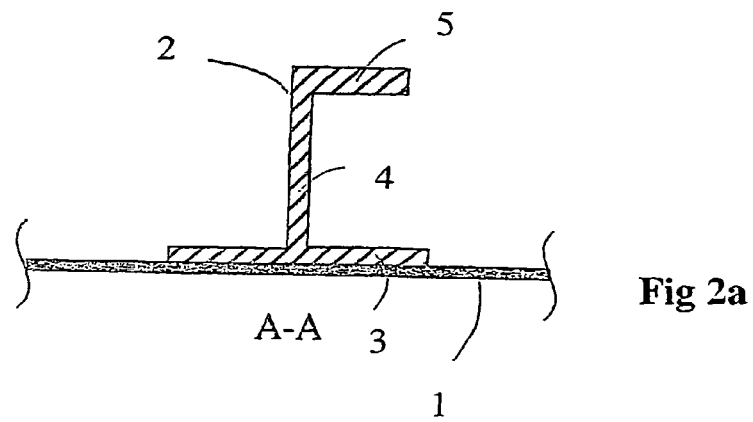
Fig 2a
Fig 2b
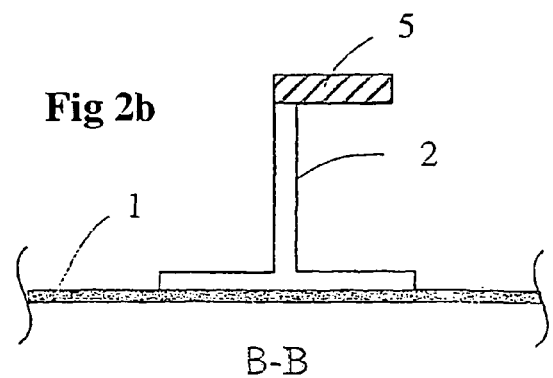

DEVICE FOR BRACING A SHELL IN AN AIRCRAFT FUSELAGE

TECHNICAL AREA

This invention concerns a device for bracing a shell surface in an aircraft fuselage against deformations and consisting of a continuous profile that is arranged so as, after conformation, to be mounted against the shell surface.

STATE OF THE ART

All types of aircraft are subject to heavy stresses. Nevertheless, production methods must be simple in order to keep costs at acceptable levels. These somewhat contradictory criteria are particularly applicable in connection with the fabrication of curved surface sections or panel surfaces used for the fuselage, wings or other parts of the aircraft.

Practically all outer surfaces of modern aircraft, be they military or civilian, are braced by means of one or more of the following methods:

Frame ribs
Stringers
Cell layers (honeycomb sandwich)

A stringer is often used in thin-sheet structures to brace a shell surface against deformations perpendicular to the sheet surface. Panels or outer sections with an outer surface part in the aircraft are equipped with supporting ribs. When these supporting ribs are disposed longitudinally, the term "stringer" is used. The purpose of these supporting ribs is to divide the aircraft surfaces into an optimal configuration so as to counteract deformation of the fields between the stringers.

Areas where there is a need for curved stringers on aircraft include:

Front and rear cabin body
Leading edges of the wings
Stabilizer panels
Double-curved openings
Control surfaces One problem with using stringers is that it is very expensive to produce stringers whose geometry conforms to the location in the aircraft where the element is to be used. When the surface of the fuselage is curved it is necessary to either mill or stretch the stringer into the desired shape, which is very expensive.

DESCRIPTION OF THE INVENTION

The foregoing problem is described by means of a new stringer design. In the design according to the invention a continuous profile of, e.g. light metal is used as a stringer. Notches are made at a regular distance apart from each other in at least a portion of the profile. The notches extend through a base surface in the profile and through an intermediate part in the direction perpendicular to the base surface. The profile also contains an upper surface that is parallel to said base surface, which upper surface is not encompassed by said notches.

When the stringer according to the invention is being mounted against the shell surface, it can be easily bent and conformed to the shape of the shell surface. After mounting, the stringer and the shell surface together form a strong and rigid unit.

One advantage of the solution according to the invention is that both the stringer and the shell surface are soft and workable prior to their being assembled together, while the finished assembled structure is strong and stable. The workable stringer radically affects durability and strength vis-a-vis loads that are perpendicular to a sheet surface, while the costs of conforming the stringer can at the same time be kept at a very low level.

DESCRIPTION OF EMBODIMENTS

Figure 1:
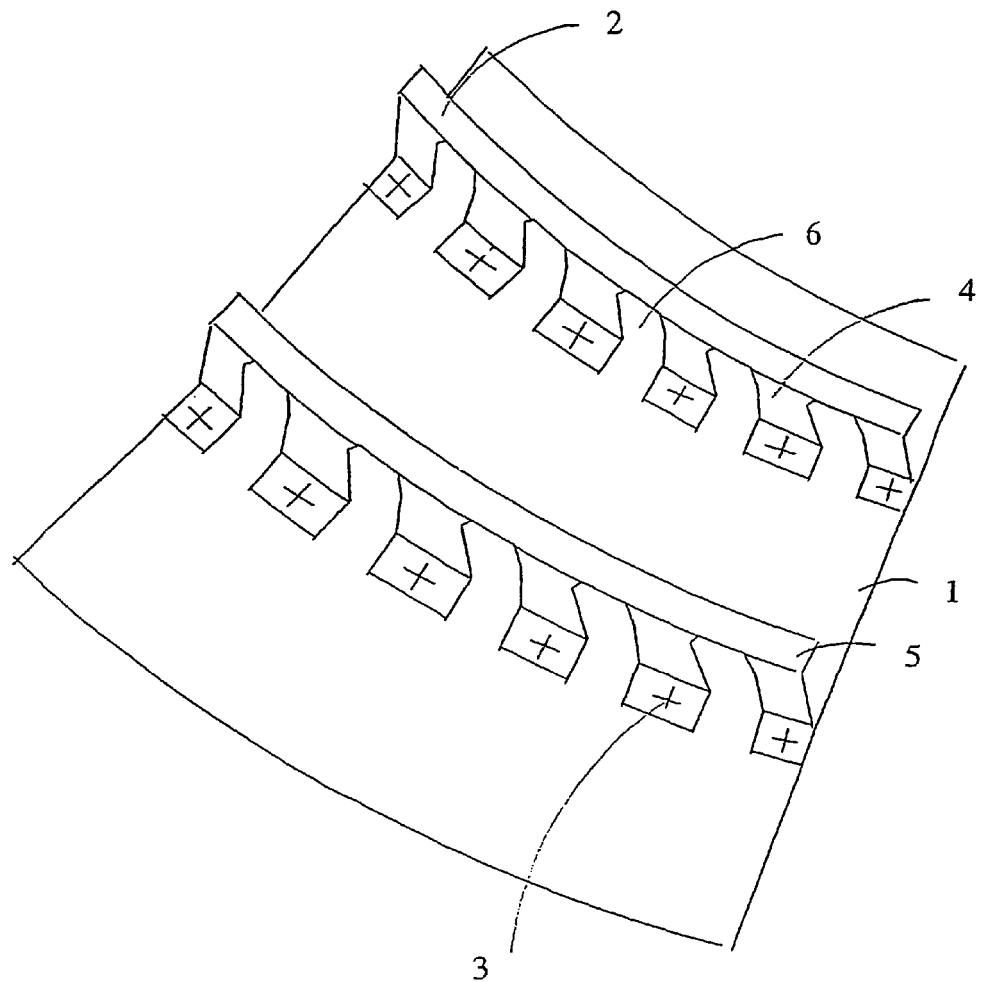
FIG. 1 Perspective view of mounted stringer
FIG. 2 Side view of mounted stringer
FIGS. 2a–2b Sectional view of a mounted stringer
FIGS. 3a–3d View in cross-section of various possible profile designs
Figure 3A:
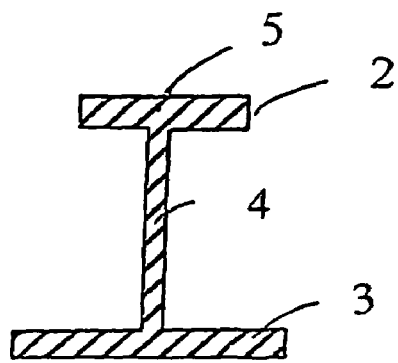
Figure 3B:
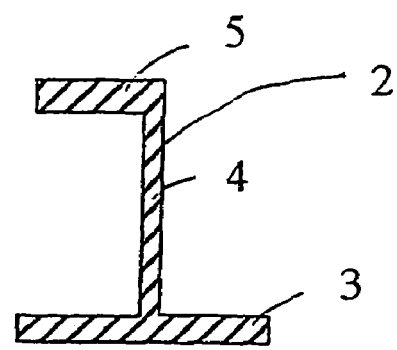
Figure 3C:
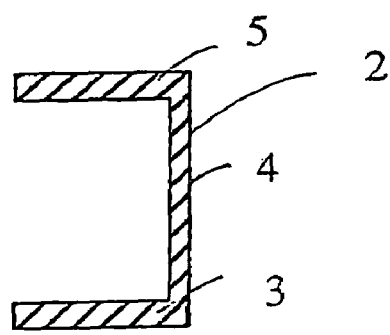
Figure 3D:
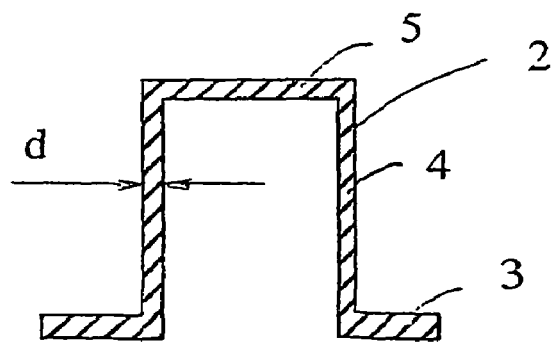

A stringer 2 can consist of a continuous profile of workable material, such as an extruded aluminum profile. FIGS. 3a–3d show a number of possible cross-sections for such a profile. The cross-section consists of a base 3 and an intermediate part 4 oriented perpendicular thereto, plus an upper surface parallel to the base 3. Designs involving a base 3, an intermediate part 4 and an upper surface 5 other than those shown in the figures are also possible. A typical thickness d for the walls of the profile is roughly 1–2 mm. The thickness of the base, the intermediate part and the upper surface may differ.

The stringer 2 must be conformed for mounting against a curved shell surface 1 in an aircraft fuselage. To facilitate this conformation, notches 6 are made at predetermined distances apart from each other along the length of the profile. In a preferred embodiment these notches 6 are spaced at a regular distance a apart from each other in order to thereby render the stringer structure independent of the shape of the aircraft section in which the structure is to be used. An appropriate distance between the notches can be roughly 25 mm, but this distance is of course dependent on the shell surface against which the stringer is to be mounted. It is also possible to make notches with varying distances between them along different portions of the length of the profile. The notches can extend through the base surface 3 and the intermediate part 4 in the direction perpendicular to the base surface 3. The notches are delimited upwardly by the upper surface 5, which thus is not encompassed by said notches 6. The base surface 3 and the upper surface 5 are joined via said intermediate part and realized in one piece therewith. The notches can be, e.g. milled or cut from the original profile. Stringers with notches can also be fabricated as yard goods, i.e. at low cost.

As a result of the design solution according to the invention, the stringer 2 can be easily bent and conformed to the shell surface 1 for the part of the fuselage against which the stringer is to be mounted. FIG. 1 shows a perspective view of two stringers 2 mounted against a shell surface 1.

Mounting can be accomplished by various methods, such as riveting, bolting, welding or gluing. Once the stringer is mounted against the shell surface, the frame ribs can be secured in the usual way.

The invention claimed is:

1. A device for bracing a shell surface in an aircraft fuselage against deformations and comprising a continuous profile that is arranged so as, after conformation, to be mounted against the shell surface, said device comprising:

at least one base surface that is arranged so as to lie against the shell surface;

at least one upper part parallel to said at least one base surface, said at least one upper part having a substantially rectangular cross-section; and said at least one perpendicular intermediate part connecting the base surface and at least one upper part, wherein the profile has notches along at least a portion of the length of the profile spaced at a regular distance from each other, which notches extend at least through the at least one base surface and through the entirety of the at least one intermediate part, and wherein the notches are delimited upwardly by said at the least one upper part, which at least one upper part is not encompassed by said notches.

2. A device according to claim 1, wherein the base surface is arranged so as to be fastened to the shell surface.

* * * * *